Patented June 1, 1943

2,320,644

UNITED STATES PATENT OFFICE 2,320,644

WAX COMPOSITION

Edward A. Nill, Detroit, Mich., assignor to The
H. A. Montgomery Company, Detroit, Mich.,
a corporation of Michigan No Drawing. Application August 15, 1938,
Serial No. 225,046

13 Claims. (Cl. 106—268)

This invention relates to improved wax compositions and a process for making the same.

Wax products are used in many industries, and it is frequently desirable to provide a wax product with improved properties. According to my invention it is possible not only to raise the melting point of many different kinds of waxes, including paraffin, ceresin, ozokerite, montan wax and the like, but also to provide wax compositions having improved physical properties, such an increase in ductility, increase in tensile strength and improved moisture repellent characteristics. By the use of the present invention it is possible to improve waxes, and particularly waxes of the paraffin type, so that they can be used in many places where it is impractical to use the more expensive waxes, such as carnauba wax, etc.

It is an object of the present invention to provide wax compositions with improved physical properties, such as high melting point, increased ductility and high tensile strength.

Another object is to provide wax compositions with fine grain structures and improved moisture repellent characteristics.

A further object is to provide improved wax compositions which are stable, retaining their improved physical properties over long periods of time, so that oxidation thereof substantially is prevented and the giving off of objectionable odors is eliminated.

A still further object is to provide wax compositions having melting points such that they may be made sterile and valuable for use in the food container industry.

Another object of the present invention is to provide improved wax compositions of the type mentioned which may be made readily and inexpensively.

Another object is to provide a composition which may be used in various proportions in connection with various hydrocarbon waxes to improve their physical properties, and which may also be used as an additive to other waxes or a substitute therefor in many applications.

Another object is to provide stable wax emulsions and a method of making the same.

According to the present invention, improved wax compositions may be made by the addition of one or more ingredients to raise substantially the melting point of the wax compositions and one or more ingredients to increase the ductility and tensile strength and to improve the moisture-repellent characteristics.

Various ingredients may be used to raise the melting point. It has been found that acidulated aromatic amino compounds accomplish this purpose. Examples of these are the anilides, toluidides, xylidides, naphthylamides, etc., of the fatty acids. If it be desired to very materially raise the melting point, the higher fatty acid compounds, such as stearic, palmitic, etc., should be used. These compounds have the property of greatly increasing the melting point of mineral waxes, such as paraffin wax.

Various compounds have been found to have the property of increasing the ductility and tensile strength of paraffin wax compositions. A compound having this effect is one of the lower fatty acid aromatic amino compounds, i. e., acetanilide.

Heavy metal soaps of fatty acids, such as stearic, palmitic, etc., have a pronounced effect on ductility and tensile strength. Such heavy metal soaps, as calcium, magnesium and aluminum soaps, are insoluble and have the property not only of increasing tensile strength and ductility, and causing refinement of the grain, but also have the property of increasing the melting point of the wax composition and, therefore, they may be used in conjunction with or to replace in part or in whole the compounds mentioned above, which effect the substantial increase in melting point of the wax compositions. When relatively high melting point wax compositions are desired, however, a small percentage of the fatty acid derivatives of the benzene series should be present, as they seem to have a greater effect in increasing the melting point of the wax composition.

Addition of a fatty acid derivative of an amino aromatic compound and a heavy metal soap to unrefined scale wax considerably raises the melting point of the resultant wax composition. However, it was found that other properties were favorably affected to a marked extent, depending on the amount of ingredients added. For example, the toughness, tensile strength and ductility of the wax compositions were appreciably increased over commercial wax compositions. This is believed to be due to the fact that the addition of the above substances gives an appreciable grain refinement to the wax or waxes so that the crystals are relatively finer and of more uniform size. It seems that the grain refinement materially aids in improving the water repelling qualities of the wax or waxes, and, consequently, renders them very desirable for use in water proofing products, such products being impregnated with or having applied thereto a coating of these improved wax compositions.

The amount of ingredients added depends largely upon the properties, and particularly the melting point, desired in the wax composition, and it has been found when the per cent of admixture is plotted against melting point temperature the curve goes up rapidly to somewhere around the region of 7.5% admixture, and from this point on the admixture does not create large changes in the melting point. However, it may be desirable to produce compositions in which the admixture is made in amounts considerably higher than 7.5% to obtain compositions having greatly increased hardness, for example.

In order to provide a composition which may be conveniently handled and shipped for addition, at the refinery, to waxes, such as slack wax, scale wax or refined wax, it has been found desirable to make up a mixture of the desired ingredients to provide an additive composition which will not only increase the melting point of the wax but will render the wax tough, ductile and give it an increased tensile strength, as well as improve its water-repellent properties. To provide such an additive composition or base for improving wax, it is desirable to use an ingredient which effects a substantial increase in the melting point of the wax, and an ingredient which gives the properties of toughness, ductility and waterproofing.

In making such an additive composition or base for improvement of waxes, a particularly desirable constituent to effect a pronounced increase in the melting point of waxes is stearanilide.

On account of its effect in increasing tensile strength and improving the grain structure, acetanilide may be a constituent of the additive base. However, when it is used with stearanilide it is used in a relatively small proportion on account of the fact that a small proportion has the effect of improving the ductility and the grain structure, whereas a larger proportion tends to decrease the melting point of the final wax composition.

The heavy metal fatty acid soaps, such as magnesium, calcium and aluminum soaps of stearic acid, are practically insoluble in water. However, such soaps are somewhat soluble in anilides, in that they combine with such compounds to make a homogeneous composition. This solubility is greatly increased by the use of a free fatty acid, such as stearic acid. As previously mentioned, such soaps have the property of increasing the ductility and decreasing the grain size of the wax, as well as tending to increase the melting point of the composition. They may be used instead of part or all of the acetanilide.

Usually such insoluble soaps are soluble at elevated temperatures in an additive composition which contains anilides, glycerides, etc. In the presence of a free fatty acid, however, the insoluble soaps may be incorporated as an ingredient in the additive base or the wax composition at a much lower temperature.

Calcium stearate, for example, is an excellent ingredient for the wax compositions, in that it is very effective in raising the melting point of the wax, as well as having the property of materially improving the tensile strength, ductility and water-repellent characteristics of the wax composition. However, when calcium stearate is added to the additive base, or wax composition including anilides, etc., it requires a temperature as high as, or higher than, 300° F. in order to combine therewith.

If a free fatty acid, such as stearic acid, is present, calcium stearate may be combined with the additive composition or with the wax composition at a much lower temperature. In making the mixture, one part of stearic acid may be utilized with ten parts of calcium soap and combination will take place at a temperature of 250° F. or lower. Lesser amounts, however, than the proportion of 1:10 will effect a decrease in the temperature required. A considerably less amount of free fatty acid, such as .5% or less, is necessary to cause low temperature combination of aluminum or magnesium soaps.

The amount of fatty acid necessary will, of course, vary with the ingredients used in the composition, but it is only desirable to use fatty acids in very small amounts, usually less than 1%, since if it is present in more than such amounts it has a tendency to lower the melting point of the wax composition.

Furthermore, these insoluble soaps have the characteristic of raising the viscosity when the wax composition is heated to a temperature as high or higher than its melting point. Thus, it may be seen that a wax composition having added thereto an admixture which includes some insoluble soap is very desirable for use in connection with containers to which steam is to be applied for sterilization purposes, because, due to the increased viscosity of the wax composition and its high melting point, the coating on the container will not tend to melt or soften. When the coating has re-cooled the container is still rendered waterproof throughout, since the coating is not displaced under heat.

While soluble soaps, such as sodium and potassium soap, have considerable effect in increasing the melting point of the wax composition, they are not usually so desirable, particularly when used in any substantial quantity, because if the wax composition is to be applied to any surfaces which are to be water-repellent the presence of a substantial amount of a soluble soap is not desirable.

Furthermore, in order to incorporate the soluble soaps, such as sodium stearate, in wax compositions, they should be substantially dry on account of the fact that sodium stearate, for example, melts at 400° F., and the wax composition must be at this temperature, or above, to obtain a homogeneous mixture.

The anilides for use in additive compositions may be produced readily by the process disclosed in my prior Patent No. 1,659,150, granted February 14, 1928. It is preferable that the anilides produced according to the above mentioned patent be further treated to purify and decolorize them. This may be done by treating the anilides with steam at a temperature above the boiling point of aniline oil, but below the boiling point of the anilide being treated. In the case of stearanilide a temperature of about 390° F. is suitable. This treatment is continued until the condensed distillate resulting from the treatment contains no trace of aniline. The anilides remaining are then treated with a diatomaceous material, such as activated carbon or fuller's earth, and filtered, thereby removing coloring matter and other impurities that may be present. The toluidides (methyl anilides), xylidides (dimethyl anilides), etc. may be similarly purified.

As a specific example of the present invention, about 2% of a mixture of stearanilide and acetanilide were added to about 98% of crude scale wax, having a melting point of about 123° F., and the resulting wax composition had a melting point of about 140° F. The toughness, tensile strength, ductility and water-repelling characteristics of the crude scale wax were also considerably improved and a wax composition obtained having a melting point higher than high-grade, refined, crystalline waxes, and having other properties resembling those of refined amorphous waxes.

When about 2.5% of an additive base comprising approximately equal parts of stearanilide and magnesium stearate was added to about 97.5% of unrefined scale waxes having a melting point in the region of 123° F., the melting point of the resultant wax composition was about 160° F. and the tensile strength, ductility and water-repellent characteristics were greatly improved. Addition of about 5% of the above additive composition raised the melting point of the scale waxes to approximately 170° F., as well as improving the other physical properties, while the addition of about 7.5% further raised the melting point to approximately 182° F., and again the tensile strength, ductility and water-repellent characteristics of the resultant wax composition showed a marked improvement. Illustrative of the effect of the additive base on tensile strength, crude scale wax having a tensile strength of 25 lbs. per square inch has a tensile strength of 34 lbs. when 2.5% of the base is present. With 5% present, the tensile strength increases to about 44 lbs., and with 7.5%, it is approximately 53 lbs.

Of course, the amount of additive base used to improve the properties of mineral waxes is dependent upon the increase in melting point desired, and also upon the type of wax being modified. To improve slack waxes which have lower melting points than scale waxes it may be necessary to add a considerably larger percentage of the additive composition in order to secure a relatively high melting point and a relatively high tensile strength, and the like.

Another feature of the improved wax compositions disclosed herein is their ability to form stable emulsions. The addition of a fatty acid anilide, toluidide, xylidide, etc., together with an insoluble fatty acid soap, to wax tends to cause the wax composition to be more easily emulsified, requiring a much smaller percentage of emulsifier, such as, for example, triethanolamine stearate, than would be required to emulsify unmodified paraffin wax. When triethanolamine stearate is used as an emulsifier a stable emulsion of wax composition may be produced, which emulsion may be shipped or stored for substantial periods of time without separation or decomposition.

Furthermore, such emulsions may be formed with from a minimum amount of water, such as 10% or so, up to a water content of 90% or so. Also, emulsions of wax, together with the addition of compositions disclosed herein, have the property of remaining homogeneous when heated. For example, when initially made an emulsion comprising about 21.75% of a wax composition embodying the present invention, about 3.25% triethanolamine stearate, and about 75% water, is creamy white and has the consistency of a hard cup grease. When heated up to above the boiling point of water, the emulsion is not destroyed but becomes thinner and less viscous. Upon cooling it is stable and is even stiffer than it was before heating. Heretofore most pariffi wax emulsions for use in treating paper, have, when heated, been converted to a thin unstable emulsion, the emulsifying agent remaining dissolved in the water and the wax separating therefrom.

More interesting, however, is the fact that this emulsion has the characteristic of higher penetration, than heretofore obtainable with wax and water emulsions. With a given quantity of water the emulsion will penetrate material to which it is applied, such as sheets of paper, more rapidly and to much greater extent than heretofore. Due to the fact that it is stable when hot, it is possible to add the emulsion directly to a hot mix of paper pulp.

With emulsions formed according to my invention it is even possible to add them to hot paper pulp suspensions containing large percentages of water without making the emulsion unstable. It forms a dilute milky liquid appearing to have the characteristics of a solution, and the paper pulp will be impregnated with the wax emulsion, uniformly dispersed therethrough. The paper, when formed into sheets, thus contains the wax in intimate association therewith.

It will also be seen that by forming a stable wax emulsion with a small amount of water or a large per cent of water it is possible to more readily control the amount of wax to be added to a given amount of paper, either while in the pulp stage or after sheets have been formed. Also, by causing a uniform dispersion of the wax a given amount of wax will impregnate or coat more paper.

In the paper industry these wax compositions may be readily used to impregnate or coat many kinds of paper and paper products. Papers and paper products coated with compositions described above are greatly improved because the waxy film adheres very tightly to the paper surface, does not easily become tacky and is very durable due to its toughness, tensile strength, ductility, etc. The grain size of such a film is very fine, and impregnated or coated papers are rendered highly impervious to moisture, even when subjected to moisture over extensive periods of time.

Wax emulsions embodying the invention disclosed herein may be made without difficulty by bringing the wax to a temperature slightly above the melting point and adding water thereto in the desired amount. If the wax and additive composition contain an emulsifier, no emulsifier need be present in the water. On the other hand, if no emulsifier is present, then triethanolamine stearate or some other emulsifier may be be dissolved in the water in the desired amount. The water is preferably at the same temperature as the melted wax composition and they are mixed and stirred until the temperature falls to just below the solidifying point of the wax, at which time an emulsion forms and stirring is no longer necessary. Stable emulsions have been made with as little as 8% or 9% wax composition, 1% or so of triethanolamine stearate, and the balance water. On the other hand, stable emulsions can be made by using 70% wax, 20% water and 10% trietranolamine stearate.

It will be seen from the above examples that emulsion of the wax compositions disclosed herein can be made with a very small amount of water, or water in amounts up to 90% or more, and such compositions are stable and may be utilized in many industries.

Although the emulsions described above have been made by the use of an emulsifier, such as triethanolamine stearate, it is contemplated that many other emulsifiers may be used, whereby emulsions of various other types will be obtained.

The improved wax compositions described herein may be made by directly mixing the ingredients in liquid form, i. e., the additive composition may be poured into a bath of the wax or the melted wax may be poured onto the additive composition. The mixture should be sufficiently stirred or agitated to make it homogeneous.

The physical properties of the improved wax compositions may be further enhanced if the ingredients are caused to be intimately contacted with each other throughout large areas. The desired intimate contact may be obtained by mixing the ingredients in a type of colloidal mill known as a homogenizer. Such a machine may be of the type in which the substances to be mixed are melted and fed in the desired proportions, such that they are caused to flow in a thin, continuous film over a swiftly rotating surface. The mixed substances are preferably admitted in a limited or controlled manner to the central portion of a disk or plate rotating at a relatively high speed, so that the mixture will be projected over the surface in a film of extreme thinness and subsequently collected.

Due to the intimate association of the ingredients of the additive composition and the waxes effected by the use of a homogenizer, smaller amounts of the additive base may be used to get the same improved physical properties of the wax composition, or with the same amounts of additive base considerably greater improvements in the physical properties of the wax composition will be obtained by effecting intimate association of the ingredients in a homogenizer. For example, a wax composition containing about 7.5% of the additive base comprising approximately equal parts of magnesium stearate and stearanilide and about 93% scale wax, gave a melting point of about 182° F. when the ingredients were merely combined and agitated. When a wax composition containing the same percentages of ingredients was treated by a homogenizer, thereby causing intimate contact of the ingredients through large areas, the physical properties of the wax composition surpassed those of the untreated wax composition, the melting point of such composition being about 210° F. The ductility and tensile strength were increased.

As mentioned above, wax compositions embodying the present invention may readily be emulsified to produce relatively stable emulsions which may stand for a considerable period of time without separation. These emulsions may also be made efficiently and economically by the use of a colloidal mill of the type mentioned, and the properties are improved in a manner corresponding to the improvements obtained by treating the wax compositions as described above.

By way of illustration, the improved wax compositions may be made so that they contain an emulsifier, triethanolamine stearate having already been described as suitable. Such a composition may be melted, mixed with hot water and projected in an extremely thin film over a swiftly rotating surface.

The product obtained is a creamy, white emulsion, which obtained may be shipped as produced and subsequently further diluted with water, if desired. As mentioned, such an emulsion is valuable for incorporation into pulp to produce many fine paper products, since in this manner coating or impregnation of finished papers may be eliminated and the papers will still have a wax composition intimately dispersed therethrough.

Furthermore, it is contemplated that wax compositions of the type disclosed herein may be used advantageously in a great many industries because of their improved physical characteristics. As one illustration, they may be readily used in coating containers and the like, because they may be made to have a melting point sufficiently high that such containers may be rendered sterile by treatment with steam prior to placing contents therein, without injuring the improved water-repelling properties of such containers.

Wax compositions embodying the present invention are also valuable, in that they are stable and do not oxidize, retaining their improved physical properties over long periods of time.

The additive composition or base, comprising an ingredient which has the ability to raise the melting point of waxes and an ingredient to improve the other physical properties of wax, is a valuable product in itself. Its composition is such that it is similar to many natural waxes, such as candelilla, Japan wax, carnauba, beeswax, and the like, and in many industries it may be used in conjunction with, or as a substitute for, many of these more expensive waxes.

Furthermore, it is to be understood that variations and modifications of the specific examples given for purposes of illustration and explanation may be made without departing from the spirit of the invention.

What I claim is:

1. A wax composition having improved properties which comprises about 2% to about 10% of a higher fatty acid anilide, about 2% to about 10% of a water-insoluble metallic fatty acid soap, and the balance mineral wax, said composition being characterized by its fine grain, increased tensile strength, increased melting point, and high water-repellency.

2. A wax composition having improved properties which comprises about 1% to about 10% of a higher fatty acid anilide, about 1% to about 10% of at least one insoluble metal fatty acid soap, and the balance mineral wax, said composition being characterized by its fine grain, increased tensile strength, increased melting point, and high water-repellency.

3. A wax composition having improved properties which comprises stearanilide and calcium stearate in amounts between about 2% and about 10% of the composition, with the balance substantially mineral wax, said composition being characterized by its fine grain, increased tensile strength, increased melting point, and high water-repellency.

4. A wax composition having improved properties which comprises stearanilide and magnesium stearate in amounts between about 2% and about 10% of the composition, and the balance mineral wax, said composition being characterized by its fine grain, increased tensile strength, increased melting point, and high water-repellency.

5. A wax composition comprising in major proportion a hydrocarbon wax derived from petroleum, a higher fatty acid anilide and a water-insoluble metal soap, said soap and said anilide being present in said wax in total amounts of about 2% to about 7.5%, said wax composition being characterized by having a fine grain, relatively high tensile strength and a melting point of at least 160° F.

6. A wax composition comprising paraffin, a higher fatty acid anilide and a water-insoluble metal soap, all present in the disperse phase, the amount of metal soap and anilide being about 2% to about 10% of said composition being characterized by having relatively fine grain, relatively high tensile strength, high water-repellency and a substantially higher melting point than have compositions containing similar paraffin and only soap or only anilide in an amount equal to the total amount of soap and anilide present.

7. A wax composition having improved properties which comprises stearanilide, an insoluble metal fatty acid soap, with the balance substantially mineral wax, said stearanilide and soap being present in a total amount of about 2% to about 10%, said composition being characterized by its fine grain, increased tensile strength, increased melting point, and high water-repellency.

8. A wax composition comprising in major proportion a hydrocarbon wax derived from petroleum, a higher fatty acid anilide, a lower fatty acid anilide, a water-insoluble soap and free higher fatty acid in an amount up to about 1% of the composition, the total amount of said soap and of said anilides being about 2% to about 10% of said composition, said composition being characterized by a finer grain, and higher tensile strength than have compositions containing the same wax content, but having said anilides or said soap present alone.

9. A wax composition comprising in major proportion a hydrocarbon wax derived from petroleum, a small amount of free higher fatty acid, a higher fatty acid anilide and a water-insoluble metal soap present in amounts between about 2% and 10% of the composition, said wax composition being characterized by having a finer grain, and higher tensile strength and a substantially higher melting point than have compositions of the same wax content, and having only soap or only anilide in an amount up to the total amount of soap and anilide present.

10. An emulsion comprising paraffin, a higher fatty acid anilide and a water-insoluble metal soap of a higher fatty acid, the amount of said metal soaps and of said anilide being about 2% to about 10% of the paraffin in the composition, said composition being characterized by having a relatively fine grain, a relatively high tensile strength and a relatively high melting point.

11. An aqueous emulsion of a wax composition comprising in major proportion a normally solid paraffin, a higher fatty acid anilide, a small amount of a higher free fatty acid and a water-insoluble metal soap, said anilide and said soap being present in a total amount of about 2% to about 10% of said wax composition, said composition being characterized by having a relatively fine grain, relatively high tensile strength, high water-repellency compared with compositions of the same paraffin content but with only soap or only anilide in an amount equal to the total of soap and anilide present.

12. An aqueous emulsion of a wax composition comprising in major proportion a normally solid paraffin, a higher fatty acid anilide, free higher fatty acid in an amount up to about 1% and a water-insoluble metal soap, said anilide and said soap being present in a total amount of about 2% to about 10% of said wax composition, said composition being characterized by having a relatively fine grain, relatively high tensile strength, high water-repellency compared with compositions of the same paraffin content but with only soap or only anilide in an amount equal to the total of soap and anilide present.

13. A wax composition having improved tensile strength, high melting point, fine grain structure, and increased water-repellent characteristics, which comprises about 1% to about 7.5% of at least one water-insoluble soap and about 1% to about 7.5% of a member of the group including the higher fatty acid anilides and their homologues, and the balance of hydrocarbon waxes having properties which are inferior to those of the composition.

EDWARD A. NILL.